(12) United States Patent
Bytnar et al.

(10) Patent No.: US 7,157,021 B2
(45) Date of Patent: Jan. 2, 2007

(54) METHODS AND COMPOSITIONS FOR DUST AND EROSION CONTROL

(75) Inventors: Stephen C. Bytnar, Greeley, CO (US); Bruce Juelfs, Windsor, CO (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 10/781,577

(22) Filed: Feb. 18, 2004

(65) Prior Publication Data

US 2004/0191401 A1 Sep. 30, 2004

Related U.S. Application Data

(60) Provisional application No. 60/447,748, filed on Feb. 19, 2003.

(51) Int. Cl.
*C09K 3/24* (2006.01)
*C09K 17/14* (2006.01)
*C09K 17/42* (2006.01)

(52) U.S. Cl. ............... 252/88.1; 106/162.1; 106/217.7; 106/217.9; 106/900; 404/76

(58) Field of Classification Search ............ 106/217.7, 106/217.9, 162.1, 900; 252/70, 88.1; 404/76
See application file for complete search history.

(56) References Cited

U.S. PATENT DOCUMENTS

| | | | |
|---|---|---|---|
| 1,910,975 A * | 5/1933 | Wallace ....................... 44/602 |
| 3,950,179 A | 4/1976 | Schneider |
| 4,022,633 A | 5/1977 | Schneider |
| 4,417,992 A | 11/1983 | Bhattacharyya et al. |
| 4,483,238 A | 11/1984 | Thakur |
| 4,571,116 A | 2/1986 | Patil et al. |
| 4,582,511 A * | 4/1986 | Siddoway et al. ............ 44/577 |
| 4,592,931 A | 6/1986 | Cargle |
| 4,594,268 A | 6/1986 | Kirwin |
| 4,650,598 A | 3/1987 | Roberts et al. |
| 4,728,393 A * | 3/1988 | Peel ............................ 162/29 |
| 4,981,398 A | 1/1991 | Field et al. |
| 5,210,112 A | 5/1993 | Shimoda et al. |
| 5,223,165 A | 6/1993 | Winstanley et al. |
| 5,328,497 A * | 7/1994 | Hazlett .......................... 71/28 |
| 5,354,787 A | 10/1994 | Shimoda et al. |
| 5,595,782 A | 1/1997 | Cole |
| 5,639,397 A | 6/1997 | Roe |
| 5,648,116 A | 7/1997 | Roe et al. |
| 5,714,387 A * | 2/1998 | Fowee et al. ................. 436/27 |
| 5,820,787 A | 10/1998 | McNabb et al. |
| 5,855,816 A | 1/1999 | McNabb et al. |
| 5,860,770 A | 1/1999 | Hunt |
| 6,071,325 A * | 6/2000 | Schmitt ....................... 75/321 |
| 6,071,411 A * | 6/2000 | Grott ......................... 210/638 |
| 6,432,166 B1 | 8/2002 | Olafson et al. |
| 6,443,661 B1 | 9/2002 | Wathen |
| 6,468,442 B1 * | 10/2002 | Bytnar ....................... 252/70 |
| 6,790,245 B1 * | 9/2004 | Wolff et al. .................. 44/602 |
| 2002/0025382 A1 | 2/2002 | Hawkins et al. |
| 2002/0134201 A1 | 9/2002 | Olafson et al. |
| 2004/0065198 A1 * | 4/2004 | Wolff et al. ................... 95/154 |
| 2004/0091324 A1 * | 5/2004 | Schilling et al. ............ 405/263 |

FOREIGN PATENT DOCUMENTS

JP 362120301 A 6/1987

OTHER PUBLICATIONS

"Molasses", Nutrition Facts and Analysis for Molasses, www.nutritiondata.com/facts-B00001-01c21Rt.html, (Feb. 2006).*

* cited by examiner

*Primary Examiner*—David M. Brunsman
(74) *Attorney, Agent, or Firm*—Buchanan Ingersoll & Rooney PC; Craig G. Cochenour; Duane A. Stewart, III

(57) ABSTRACT

The invention is directed to compositions and methods for treating a particulate and for dust and erosion control. The compositions comprise a dissolved sugar solid. Preferably, the composition comprises a dissolved sugar solid, further in combination with a salt or a lignin, or combinations thereof.

27 Claims, 4 Drawing Sheets

METHODS AND COMPOSITIONS FOR DUST AND EROSION CONTROL

BENEFIT OF PRIOR PROVISIONAL APPLICATION

This utility patent application claims the benefit of co-pending U.S. Provisional Patent Application Ser. No. 60/447,748, filed on Feb. 19, 2003, entitled "Methods and Compositions for Dust and Erosion Control," having one of the named applicants as inventor, namely Stephen Bytnar. The entire contents of U.S. Provisional Patent Application Ser. No. 60/447,748 are incorporated by reference into this utility application.

BACKGROUND OF THE INVENTION

1. Field of the Invention

The present invention relates to particulate treating compositions and methods of treating a particulate.

2. Description of the Related Art

Particulate treating compositions are well known in the art. These compositions are typically liquid compositions that are sprayed or otherwise dispersed onto the surface of materials that generate particles into the surrounding air in an attempt to control or suppress the dispersion of these particles. These compositions are also used to bind particulate materials together to control or suppress erosion of the materials.

U.S. Patent Nos. 3,950,179 and 4,022,633 describe hydrous compositions for stabilizing finely divided soils comprising a gum swellable when hydrated. U.S. Pat. No. 4,417,992 describes dust control by applying a dust inhibiting amount of a liquid dispersion of highly branched water swellable polymers. U.S. Pat. No. 4,483,238 describes dust control methods in longwall mining. U.S. Pat. No. 4,571,116 describes methods and compositions for suppressing dust using an aqueous emulsion of a blend of asphalt and a petroleum extender. U.S. Pat. No. 4,592,931 describes methods for soil stabilization and fugitive dust control by treating with a mixture of polyacrylic acids or polyacrylates, a dibasic acid or acid salt and a wetting agent. U.S. Pat. No. 4,594,268 describes a method for suppressing dust using methacrylate containing emulsions and compositions. U.S. Pat. No. 4,650,598 describes a method suppressing dust comprising contacting a dust-producing material with an emulsion comprising water and at least one methacrylate polymer, at least one hydrophobic liquid, and at least one emulsifying surfactant. U.S. Pat. No. 4,981,398 describes dust suppressants consisting of oil dispersions of water-soluble anionic polymer particles mixed with water. U.S. Pat. No. 5,210,112 and U.S. Pat. No. 5,354,787 describe a soil stabilizing agent comprising a mixture of a material mainly composed of quick lime and/or calcined dolomite and fibrillatable polytetrafluoroethylene resin. U.S. Pat. No. 5,223,165 describes the use of alkyl glycosides for dust suppression. U.S. Pat. No. 5,595,782 describes an oil based dust suppression suspension that includes sugar polymer particles suspended in an oil base. U.S. Pat. No. 5,639,397 and U.S. Pat. No. 5,648,116 describe a method for suppressing the dissemination of fugitive dust particles into the atmosphere by using an aqueous solution of a water soluble copolymer. U.S. Pat. No. 5,714,387 describes tracer technology for dust control. U.S. Pat. Nos. 5,820,787 and 5,855,816 describe dust suppression by treating solids with a blend of water and distillation bottoms. U.S. Pat. No. 5,860,770 describes a composition to control soil erosion and to prevent fugitive dust containing monomeric resins, enzymes, surfactants and water. U.S. Pat. No. 6,071,411 describes a method of treating soil for controlling dust and for effecting soil stabilization through the application of waste water. U.S. Pat. No. 6,432,166 and U.S. Patent Application Publication No. U.S. 2002/0134201 A1 describe a process for the control of dust on ore handling points comprising applying to the ore an aqueous solution of an alkyl polyglucoside. U.S. Pat. No. 6,443,661 describes a treatment product for earth surfaces that includes a fatty acid containing material and water in at least a temporary semi-emulsion state. U.S. Patent Application Publication No. U.S. 2002/0025382 A1 describes a heterogeneous mixture produced by blending aliphatic or cyclic organic compounds with carboxylic acids and applied to soils in a manner to produce high levels of dust and erosion control, and soil stabilization.

There are currently several commercially available dust control and soil stabilization agents. One example is Dust-Gard™. DustGard™ is a magnesium chloride based dust control and soil stabilization agent that is produced from solar evaporation of Great Salt Lake brines with a minimum magnesium chloride concentration of 30%. EnviroCal™ Calcium Chloride is a calcium chloride based dust control and soil stabilization agent. Tembec™ Lignin Sulfonate is a dust control agent produced during the processing of trees, and has an average solid content of 50%. PennzSuppress D™ is a dust control agent that is based on emulsified petroleum resin that is produced from the refinement of petroleum feed stocks.

Dust generation is a common problem found on transportation thoroughfares, mines, mineral storage piles, tailings storage, and other areas where particulates may be generated and dispersed into the air and onto surrounding surfaces. A common method that has been used to suppress and control the dust consists of merely wetting down the area with water. Although environmentally benign, this method has a very limited duration, as once the water evaporates, the effect no longer exists. Moreover, because of its limited duration, a tremendous amount of water resources are wasted. In attempts to improve upon this, hygroscopic salts such as magnesium chloride or calcium chloride are often added to the water in attempts to enhance the surface moisture retention. Although more effective, these compositions result in high usage of salts and have undesired environmental impacts. Another method used to control dust generation is spraying the area with an oil based composition. Although quite effective at suppressing dust generation for extended periods of time, this method is not environmentally sensitive. In addition to the harm it can impose on the environment, it may pose a significant long term clean-up problem and even potential health hazards. Moreover, the oil treated substrates may adhere to vehicles attempting to travel over the treated substrate, generating unwanted clean-up, excess wear on mechanical equipment, and accelerated breakdown of the treated surface.

In addition to dust generation, erosion and loss of substrate is another common problem found on surfaces that are prone to particulate generation, particularly those subject to vehicular, pedestrian or other sorts of traffic.

Similar methods as described above have been used to limited success, however, the same shortcomings apply when used in this capacity.

There exists a need for an agent that improves upon these deficiencies, and the compositions and methods of the invention fulfill this need.

BRIEF SUMMARY OF THE INVENTION

It is a general object of the invention to provide a composition and method for treating a particulate material.

It is a specific object of the invention to provide a composition for treating a particulate comprising an aqueous particulate treating agent comprising a dissolved sugar solid.

It is another specific object of the invention to provide a composition for treating a particulate material comprising an aqueous particulate material treating agent comprising a dissolved sugar solid, wherein said dissolved sugar solid comprises between about 2 percent to about 60 percent by weight of a monosaccharide.

It is a further specific object of the invention to provide a composition for treating a particulate comprising between about 15 to about 50 percent by weight on a dry basis of a sugar solid, wherein said sugar solid comprises between about 2 percent to about 60 percent by weight of a monosaccharide; and between about 60 to about 90 percent by weight on a dry basis of a salt.

It is another specific object of the invention to provide a composition for treating a particulate comprising a sugar-water solution having between about 15 to about 80 percent by weight of a dissolved sugar solid, wherein said dissolved sugar solid comprises between about 2 to about 60 percent by weight of a monosaccharide; and a salt.

It is a further specific object of the invention to provide a composition for treating a particulate comprising between about 5 to about 50 percent by weight on a dry basis of a sugar solid.

It is another general object of the invention to provide a dust control and soil stabilizing composition and method.

It is a specific object of the invention to provide a dust control and soil stabilizing composition and method comprising a dissolved sugar solid.

It is another specific object of the invention to provide a dust control and soil stabilizing composition comprising an aqueous dust control and soil stabilizing composition comprising a dissolved sugar solid, wherein said dissolved sugar solid comprises between about 2 percent to about 60 percent by weight of a monosaccharide.

It is a further general object of the invention to provide a surface treated with the compositions of the present invention.

BRIEF DESCRIPTION OF THE DRAWINGS/FIGURES

DETAILED DESCRIPTION OF THE INVENTION

Figure 1:
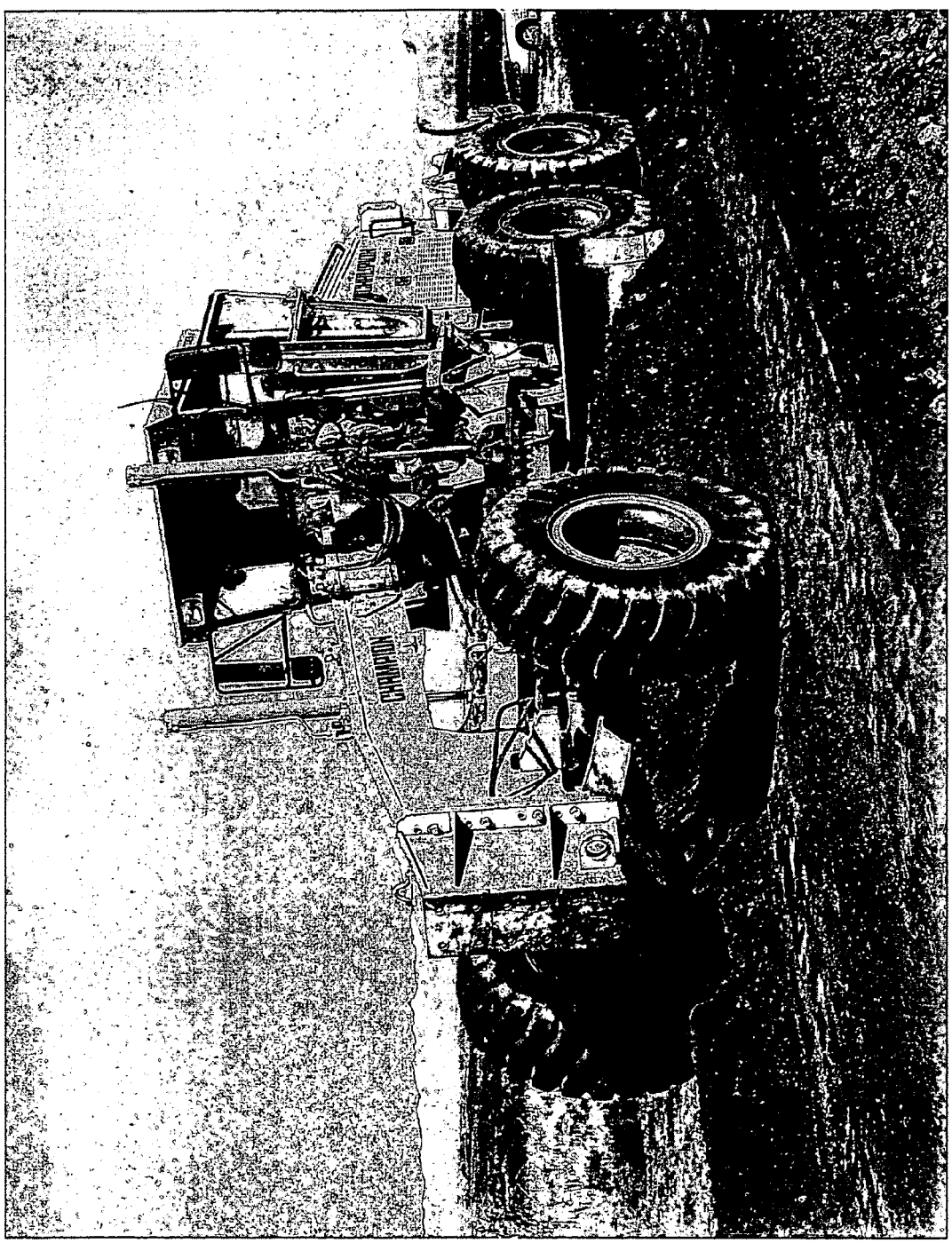
FIG. 1 is a picture of the preparation of the road surface after the initial application of the Caliber®/magnesium chloride blend of Example 1.
Figure 2:
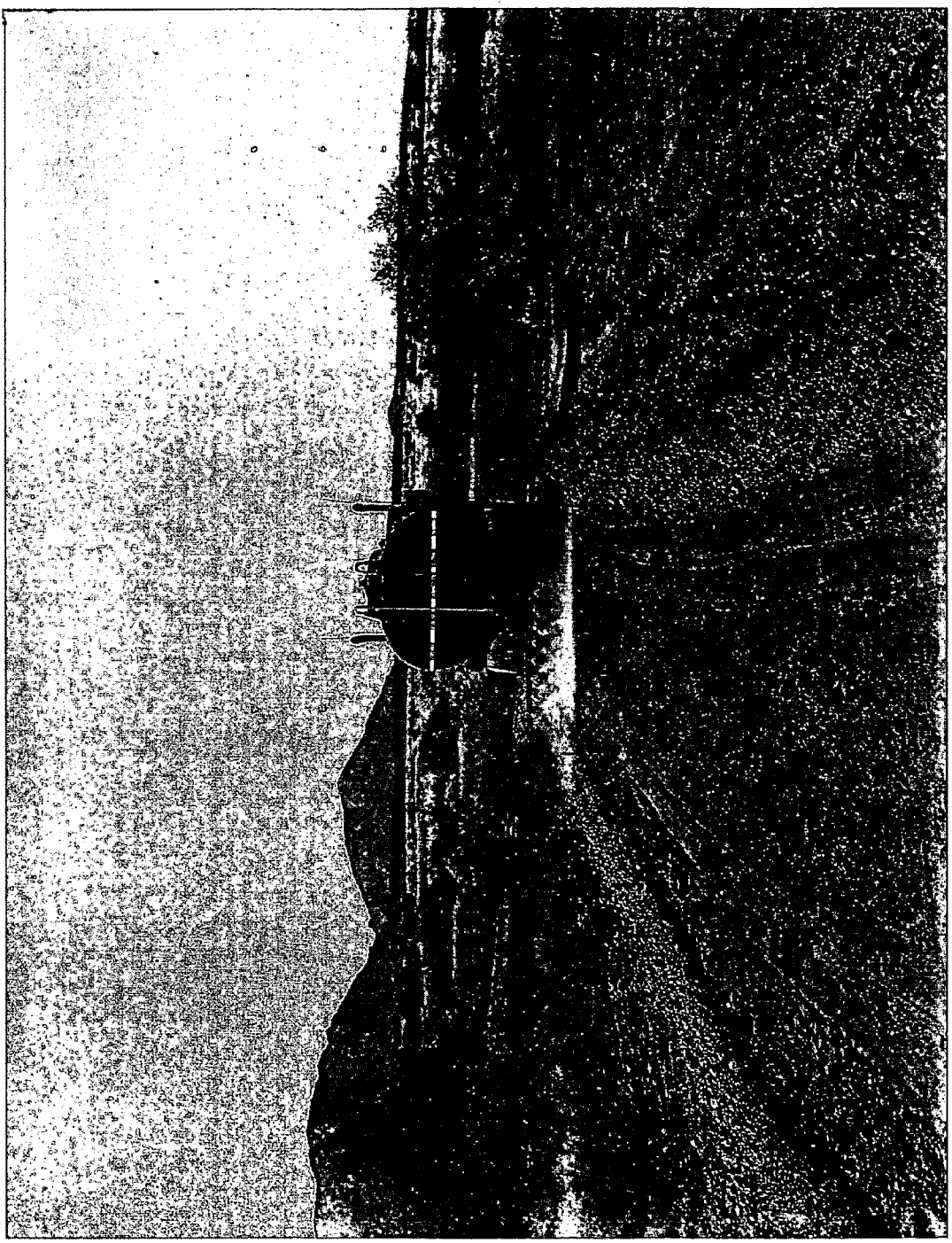
FIG. 2 is a picture of the spraying procedure used in Example 1
Figure 3:
FIG. 3 is a picture of the road surface immediately after application of the Caliber®/magnesium chloride blend of Example 1.
Figure 4:
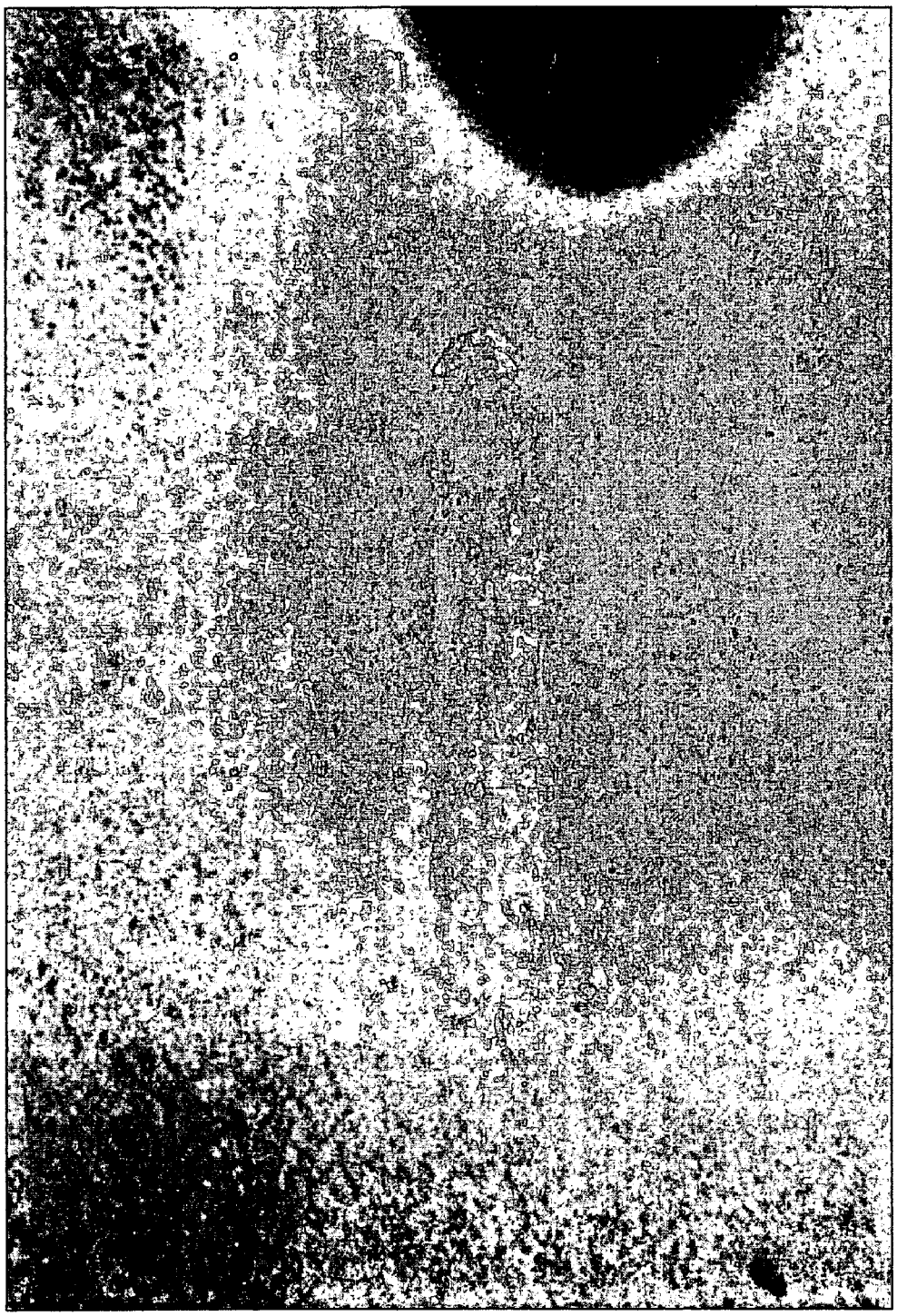
FIG. 4 is a picture of a skid mark left on the road surface four and a half months after the application of the Caliber®/magnesium chloride blend of Example 1.

The present invention relates to composition and methods for treating a particulate material. The present invention further relates to compositions and methods for dust control and soil stabilization.

By "monosaccharide," is meant a single molecule (monomer) sugar unit.

By "polysaccharide," is meant more than one linked sugar units.

By "particulate," is meant a minute quantity or fragment of a substance.

By "tracer," is meant a substance that allows for visual tracking of the applied composition.

By "hygroscopic salt," is meant a salt that is able to absorb moisture.

By "friable solid," is meant a solid substance that is easily crumbled or pulverized to produce particulates.

By "aqueous particulate treating agent," is meant a water-containing composition that is sprayed or otherwise distributed (such as, but not limited to, by use of foam) onto the surface of materials that disperse particles into their surroundings in an attempt to control or suppress the dispersion of those particles.

By "aqueous dust control and soil stabilizing agent," is meant a water-containing composition that is sprayed or otherwise distributed (such as, but not limited to, by use of foam) onto a soil or similar surface in an attempt to control or suppress the dispersion of soil particles.

In one embodiment, provided is a method and composition for treating a particulate comprising an aqueous particulate treating agent comprising a dissolved sugar solid.

In a further embodiment, provided is a method and composition for treating a particulate comprising an aqueous particulate treating agent comprising a dissolved sugar solid, wherein said dissolved sugar solid comprises between about 2 percent to about 60 percent by weight of a monosaccharide.

In another embodiment, provided is a dust control and soil stabilizing method and composition comprising an aqueous dust control and soil stabilizing composition comprising a dissolved sugar solid.

In a further embodiment, provided is a dust control and soil stabilizing method and composition comprising an aqueous dust control and soil stabilizing composition comprising a dissolved sugar solid, wherein said dissolved sugar solid comprises between about 2 percent to about 60 percent by weight of a monosaccharide.

In another embodiment, provided is a method and composition for treating a particulate comprising between about 5 percent to about 50 percent by weight on a dry basis of a sugar solid.

In a further embodiment, provided is a method and composition for treating a particulate comprising between about 15 to about 50 percent by weight on a dry basis of a sugar solid, wherein said sugar solid comprises between about 2 percent to about 60 percent by weight of a monosaccharide; and between about 60 to about 90 percent by weight on a dry basis of a salt.

In another embodiment, provided is a method composition for treating a particulate comprising a sugar-water solution having between about 15 to about 80 percent by weight of a dissolved sugar solid, wherein said dissolved sugar solid comprises between about 2 to about 60 percent by weight of a monosaccharide; and a salt.

It can be conceived that any salt can be used in the formulation of the composition of the present invention. In one embodiment, hygroscopic salts are used because of their ability to absorb moisture. Examples of hygroscopic salts include, but not limited to, are magnesium chloride, sodium chloride, calcium chloride, and potassium chloride.

In a further embodiment, the salt used in the formulation of the composition of the present invention can range in concentrations from between about 1 percent to about 99 percent by weight; from between about 1 percent to about 90 percent by weight; from between about 1 percent to about 80 percent by weight; from between about 1 percent to about 70 percent by weight; from between about 1 percent to about 60 percent by weight; from between about 1 percent to about 50 percent by weight; from between about 1 percent to about 40 percent by weight; from between about 1 percent to about 30 percent by weight; from between about 1 percent to about 20 percent by weight; from between about 1 percent to about 10 percent by weight; from between about 1 percent to about 5 percent by weight; from between about 5 percent to about 99 percent by weight; from between about 10 percent to about 99 percent by weight; from between about 20 percent to about 99 percent by weight; from between about 30 percent to about 99 percent by weight; from between about 40 percent to about 99 percent by weight; from between about 50 percent to about 99 percent by weight; from between about 60 percent to about 99 percent by weight; from between about 70 percent to about 99 percent by weight; from between about 80 percent to about 99 percent by weight; from between about 90 percent to about 99 percent by weight; from between about 95 percent to about 99 percent by weight; from between 1 percent to 90 percent by weight; from between 1 percent to 80 percent by weight; from between 1 percent to 70 percent by weight; from between 1 percent to 60 percent by weight; from between 1 percent to 50 percent by weight; from between 1 percent to 40 percent by weight; from between 1 percent to 30 percent by weight; from between 1 percent to 20 percent by weight; from between 1 percent to 10 percent by weight; from between 1 percent to 5 percent by weight; from between 5 percent to 99 percent by weight; from between 10 percent to 99 percent by weight; from between 20 to 99 percent by weight; from between 30 percent to 99 percent by weight; from between 40 percent to 99 percent by weight; from between 50 percent to 99 percent by weight; from between 60 percent to 99 percent by weight; from between 70 percent to 99 percent by weight; from between 80 percent to 99 percent by weight; from between 90 percent to 99 percent by weight; and from between 95 percent to 99 percent by weight.

A variety of sugars may be used within the scope of the invention. The natural tackiness provided by sugar solutions is a mechanism that is useful in the present invention. In one embodiment, the invention may contain a sugar solution (sweetwater) with as little as 5% sugar solids. In another embodiment, sweetwater may be mixed with a brine such that the mixture of sweetwater and brine contains as little as 1% sugar solids, and the mixture may suffice for the methods of the present invention with beneficial characteristics over a pure brine.

Examples of sugars to be used within the scope of the invention include, but are not limited to, are corn sugar, cane sugar, beet sugar, sorghum sugar, maple sugar, wheat sugar, tapioca sugar, potato sugar, cassava sugar, and manioca sugar. The composition of the invention may contain a sugar-water solution, or, in another embodiment, the composition may contain a composition for treating a particulate material that is a dissolved sugar solid.

In another embodiment, the dissolved sugar solid may contain approximately 2–60 percent by weight of a monosaccharide. In other embodiments, the dissolved sugar solid may contain about 6–39 percent by weight of the monosaccharide, or 12–18 percent by weight of the monosaccharide. In yet other embodiments, the dissolved sugar solid may contain about 14 percent by weight of the monosaccharide.

In a further embodiment, the dissolved sugar solid may be in the range of between about 1 percent to about 99 percent by weight; from between about 1 percent to about 90 percent by weight; from between about 1 percent to about 80 percent by weight; from between about 1 percent to about 70 percent by weight; from between about 1 percent to about 60 percent by weight; from between about 1 percent to about 50 percent by weight; from between about 1 percent to about 40 percent by weight; from between about 1 percent to about 30 percent by weight; from between about 1 percent to about 20 percent by weight; from between about 1 percent to about 10 percent by weight; from between about 1 percent to about 5 percent by weight; from between about 5 percent to about 99 percent by weight; from between about 10 percent to about 99 percent by weight; from between about 20 percent to about 99 percent by weight; from between about 30 percent to about 99 percent by weight; from between about 40 percent to about 99 percent by weight; from between about 50 percent to about 99 percent by weight; from between about 60 percent to about 99 percent by weight; from between about 70 percent to about 99 percent by weight; from between about 80 percent to about 99 percent by weight; from between about 90 percent to about 99 percent by weight; from between about 95 percent to about 99 percent by weight; from between 1 percent to 90 percent by weight; from between 1 percent to 80 percent by weight; from between 1 percent to 70 percent by weight; from between 1 percent to 60 percent by weight; from between 1 percent to 50 percent by weight; from between 1 percent to 40 percent by weight; from between 1 percent to 30 percent by weight; from between 1 percent to 20 percent by weight; from between 1 percent to 10 percent by weight; from between 1 percent to 5 percent by weight; from between 5 percent to 99 percent by weight; from between 10 percent to 99 percent by weight; from between 20 percent to 99 percent by weight; from between 30 percent to 99 percent by weight; from between 40 percent to 99 percent by weight; from between 50 percent to 99 percent by weight; from between 60 percent to 99 percent by weight; from between 70 percent to 99 percent by weight; from between 80 percent to 99 percent by weight; from between 90 percent to 99 percent by weight; from between 95 percent to 99 percent by weight.

In yet another embodiment, the dissolved sugar solid may contain the monosaccharide in the range of between about 1 percent to about 99 percent by weight; from between about 1 percent to about 90 percent by weight; from between about 1 percent to about 80 percent by weight; from between about 1 percent to about 70 percent by weight; from between about 1 percent to about 60 percent by weight; from between about 1 percent to about 50 percent by weight; from between about 1 percent to about 40 percent by weight; from between about 1 percent to about 30 percent by weight; from between about 1 percent to about 20 percent by weight; from between about 1 percent to about 10 percent by weight; from between about 1 percent to about 5 percent by weight; from between about 5 percent to about 99 percent by weight; from between about 10 percent to about 99 percent by weight; from between about 20 percent to about 99 percent by weight; from between about 30 percent to about 99 percent by weight; from between about 40 percent to about 99 percent by weight; from between about 50 percent to about 99 percent by weight; from between about 60 percent to about 99 percent by weight; from between about 70 percent to about 99 percent by weight; from between about 80 percent to about 99 percent by weight; from between about 90 percent to about 99 percent by weight; from between about 95 percent to about 99 percent by weight; from between 1 percent to 90 percent by weight; from between 1 percent to 80 percent by weight; from between 1 percent to 70 percent by weight; from between 1 percent to 60 percent by weight; from between 1 percent to 50 percent by weight; from between 1 percent to 40 percent by weight; from between 1 percent to 30 percent by weight; from between 1 percent to 20 percent by weight; from between 1 percent to 10 percent by weight; from between 1 percent to 5 percent by weight; from between 5 percent to 99 percent by weight; from between 10 percent to 99 percent by weight; from between 20 percent to 99 percent by weight; from between 30 percent to 99 percent by weight; from between 40 percent to 99 percent by weight; from between 50 percent to 99 percent by weight; from between 60 percent to 99 percent by weight; from between 70 percent to 99 percent by weight; from between 80 percent to 99 percent by weight; from between 90 percent to 99 percent by weight; from between 95 percent to 99 percent by weight.

The term "monosaccharide" will be used throughout this specification to refer to a single molecule (monomer) sugar unit, such as, but not limited to, dextrose. The balance of the sugar solid may be polymers of dextrose. The presence of monosaccharides is only one aspect of the present invention, and in no way is a limiting embodiment. The presence of polysaccharides in varying concentrations is a further non-limiting embodiment of the present invention.

In one embodiment, the dissolved sugar solid may contain the polysaccharide in the range of between about 1 percent to about 99 percent by weight; from between about 1 percent to about 90 percent by weight; from between about 1 percent to about 80 percent by weight; from between about 1 percent to about 70 percent by weight; from between about 1 percent to about 60 percent by weight; from between about 1 percent to about 50 percent by weight; from between about 1 percent to about 40 percent by weight; from between about 1 percent to about 30 percent by weight; from between about 1 percent to about 20 percent by weight; from between about 1 percent to about 10 percent by weight; from between about 1 percent to about 5 percent by weight; from between about 5 percent to about 99 percent by weight; from between about 10 percent to about 99 percent by weight; from between about 20 percent to about 99 percent by weight; from between about 30 percent to about 99 percent by weight; from between about 40 percent to about 99 percent by weight; from between about 50 percent to about 99 percent by weight; from between about 60 percent to about 99 percent by weight; from between about 70 percent to about 99 percent by weight; from between about 80 percent to about 99 percent by weight; from between about 90 percent to about 99 percent by weight; from between about 95 percent to about 99 percent by weight; from between 1 percent to 90 percent by weight; from between 1 percent to 80 percent by weight; from between 1 percent to 70 percent by weight; from between 1 percent to 60 percent by weight; from between 1 percent to 50 percent by weight; from between 1 percent to 40 percent by weight; from between 1 percent to 30 percent by weight; from between 1 percent to 20 percent by weight; from between 1 percent to 10 percent by weight; from between 1 percent to 5 percent by weight; from between 5 percent to 99 percent by weight; from between 10 percent to 99 percent by weight; from between 20 percent to 99 percent by weight; from between 30 percent to 99 percent by weight; from between 40 percent to 99 percent by weight; from between 50 percent to 99 percent by weight; from between 60 percent to 99 percent by weight; from between 70 percent to 99 percent by weight; from between 80 percent to 99 percent by weight; from between 90 percent to 99 percent by weight; from between 95 percent to 99 percent by weight.

One embodiment of the invention uses 25 Dextrose Equivalent (D.E.) corn syrup (CSU) in the sweetwater, although other varieties of corn syrups may also be used. One suitable 25 D.E. corn syrup has the following profile:
77.5% solids
5.0 pH
0.3% ash carbohydrate profile on a dry solid basis (D.S.B.):
 dextrose: 8%
 maltose: 8%
 malt-triose: 8%
 higher saccharides: 76%

The 25 D.E. corn syrup may be diluted with water to about 40 percent solids, although any concentration of 25 D.E. corn syrup could be used, such as between about 30 to about 70 percent solids. This 25 D.E. corn syrup, diluted to about 40 percent solids, may then be mixed with other substances, in particular chloride salts, in varying ratios to produce a mixture with desired dust suppression characteristics. It should be noted that the final percent solids in the mixture may be a significant number for performance of the mixtures of the invention.

Another embodiment of the invention uses 36 D.E. corn syrup (CSU) in the sweetwater. One suitable 36 D.E. corn syrup has the following carbohydrate profile on a dry solid basis:
dextrose: 14%
maltose: 11.5%
malt-triose: 10.5%
higher saccharides: 64%

In addition, 43 D.E. corn syrup, 63 D.E. corn syrup, and other corn syrups could also be used in the sweetwater. The corn syrup or other sweetwater of the invention may be used in varying percent sugar solids. For example, in one embodiment, the corn syrup or sweetwater may have a sugar solids percent of between about 15 to about 90 percent. In other embodiments, the corn syrup or sweetwater may have between about 15 to about 80 percent sugar solids, between about 30 to about 75 percent sugar solids, between about 40 to about 70 percent sugar solids, between about 50 to about 70 percent sugar solids, or about 60 percent sugar solids. In another embodiment, the corn syrup or sweetwater may have a sugar solids percent of between 15 to 90 percent. In other embodiments, the corn syrup or sweetwater may have between 15 to 80 percent sugar solids, between 30 to 75 percent sugar solids, between 40 to 70 percent sugar solids, between 50 to 70 percent sugar solids, or 60 percent sugar solids. The corn syrup used within the scope of the invention may be made by any process known to those skilled in the art, including a wet corn milling process.

In another embodiment, a sugar profile of the corn syrup may be between about 2 to about 60 percent dextrose, between about 2 to about 60 percent maltose, between about 2 to about 60 percent maltotriose, and between about 15 to about 80 percent polymers of dextrose. In another embodiment, the sugar profile of the corn syrup may be about 14 percent dextrose, between about 11 to about 12 percent maltose, between about 10 to about 11 percent maltotriose, and about 64 percent polymers of dextrose. In still other embodiments, the sugar solid contains between about 6 to about 40 percent by weight of the monosaccharide, between about 12 to about 18 percent by weight of the monosaccharide, or about 14 percent by weight of the monosaccharide. In yet another embodiment, a sugar profile of the corn syrup may be between 2 to 60 percent dextrose, between 2 to 60 percent maltose, between 2 to 60 percent maltotriose, and between 15 to 80 percent polymers of dextrose. In another embodiment, the sugar profile of the corn syrup may be 14 percent dextrose, between 11 to 12 percent maltose, between 10 to 11 percent maltotriose, and 64 percent polymers of dextrose. In still other embodiments, the sugar solid contains between 6 to 40 percent by weight of the monosaccharide, between 12 to 18 percent by weight of the monosaccharide, or 14 percent by weight of the monosaccharide.

In a further embodiment, any of the compositions of the present invention may further comprise lignin. Lignin is one of the most abundant organic substances on earth and is a structural polymer that is found in woody plants. Numerous industrial processes that utilize wood involve the removal of lignin. Lignin, when used alone, acts as a binding agent when used to treat particulates. However, lignin tends to become brittle unless mixed with other agents, such as those of the present invention.

In one embodiment, the lignin may be in the range of between about 1 percent to about 99 percent by weight; from between about 1 percent to about 90 percent by weight; from between about 1 percent to about 80 percent by weight; from between about 1 percent to about 70 percent by weight; from between about 1 percent to about 60 percent by weight; from between about 1 percent to about 50 percent by weight; from between about 1 percent to about 40 percent by weight; from between about 1 percent to about 30 percent by weight; from between about 1 percent to about 20 percent by weight; from between about 1 percent to about 10 percent by weight; from between about 1 percent to about 5 percent by weight; from between about 5 percent to about 99 percent by weight; from between about 10 percent to about 99 percent by weight; from between about 20 percent to about 99 percent by weight; from between about 30 percent to about 99 percent by weight; from between about 40 percent to about 99 percent by weight; from between about 50 percent to about 99 percent by weight; from between about 60 percent to about 99 percent by weight; from between about 70 percent to about 99 percent by weight; from between about 80 percent to about 99 percent by weight; from between about 90 percent to about 99 percent by weight; from between about 95 percent to about 99 percent by weight; from between 1 percent to 90 percent by weight; from between 1 percent to 80 percent by weight; from between 1 percent to 70 percent by percent by weight; from between 1 percent to 60 percent by percent by weight; from between 1 percent to 50 percent by percent by weight; from between 1 percent to 40 percent by percent by weight; from between 1 percent to 30 percent by percent by weight; from between 1 percent to 20 percent by percent by weight; from between 1 percent to 10 percent by percent by weight; from between 1 percent to 5 percent by percent by weight; from between 5 percent to 99 percent by weight; from between 10 percent to 99 percent by weight; from between 20 percent to 99 percent by weight; from between 30 percent to 99 percent by weight; from between 40 percent to 99 percent by weight; from between 50 percent to 99 percent by weight; from between 60 percent to 99 percent by weight; from between 70 percent to 99 percent by weight; from between 80 percent to 99 percent by weight; from between 90 percent to 99 percent by weight; from between 95 percent to 99 percent by weight.

In another embodiment, any of the compositions of the present invention may further comprise a tracer. The tracer allows visual tracking of the compositions of the present invention as they are applied. This facilitates even application of the compositions and prevents areas from being missed during the application process, and also prevents areas from having too much of the compositions applied. The tracer may be present in quantities sufficient to allow visualization of the applied composition by the naked eye under normal daylight conditions, or alternatively, under low light conditions or darkness. In an additional embodiment, the tracer is a fluorescent dye.

In one embodiment, the present invention provides a method of treating a particulate material comprising applying to said particulate material any of the compositions provided by the present invention. In another embodiment, the present invention provides a method for suppressing a particulate material comprising contacting said particulate material with an effective amount of any of the compositions provided by the present invention. In a further embodiment, the present invention provides a method of treating a surface comprising applying to said surface an effective amount of any of the compositions provided by the present invention. In an additional embodiment, the present invention provides a method of stabilizing a surface and suppressing dust and erosion in a surface comprising applying to said surface an effective amount of any of the compositions provided by the present invention.

In one embodiment, the particulate material or surface is a friable solid. In yet another embodiment, the friable solid is a gravel, a soil, a dirt, a cinder, a sand, a mineral, coal, coal dust, rock dust, clay, sawdust, woodchips, bark mulch, or an aggregate.

In a further embodiment, the particulate material or surface to be treated by the methods and compositions of the present invention may be present, for example but not limited to, on, in or about a road, a mine, a mineral storage pile, a railway transit car, a storage container, a road, a walkway, a parking lot, a floor, a coal pile, a runway, a helicopter landing pad, a driveway, a bicycle path, a jogging path, a forest trail, a garden path, a construction site, a mine tailing pond, a tailings pile, a slope or berm, a sand dune, or a hillside. A surface treated by the composition of the invention is also an object of the invention.

In yet another embodiment, the composition of the present invention is applied using any apparatus useful for dispersing liquid composition. Examples of such apparatus, include but are not limited to a water truck, a sprayer truck, a tractor-trailer tanker, a computerized spray bar, a mining tanker, a towable tank, an all-wheel drive tanker, a water pull, a mix paver, a tailing pond machine, a military tanker vehicle, a hydroseeder, a crane and pump, a crop duster airplane, a crop duster helicopter, a hand sprayer, a helicopter drop container, a rotary cross-shaft mixer, or a spraying roto-tiller.

The subject invention includes a composition for treating a particulate comprising an aqueous particulate treating agent that includes a dissolved sugar solid that has between about 2 percent to about 60 percent by weight of a monosaccharide. The sugar solid may be present in an amount between about 1 percent to about 99 percent by weight of the composition.

The composition of the invention may further include a hygroscopic salt, including but not limited to magnesium chloride, sodium chloride, calcium chloride, and potassium chloride. The salt may be present in an amount between about 1 percent to about 99 percent by weight.

The subject invention further includes a dust control and soil stabilizing composition comprising a dissolved sugar solid that is between about 2 percent to about 60 percent by weight of a monosaccharide. Other percentages of monosaccharide are contemplated, including but not limited to about 12 percent to about 18 percent by weight. The dissolved sugar solid may be between about 1 percent to about 99 percent by weight of the total composition.

The dust and soil stabilizing composition may further include a hygroscopic salt, including but not limited to magnesium chloride, sodium chloride, calcium chloride, and potassium chloride. The salt may be present in an amount between about 1 percent and about 99 percent by weight.

The present invention also provides a composition for treating a particulate comprising between about 15 to about 50 percent by weight on a dry basis of a sugar solid, where the sugar solid is between about 2 percent to about 60 percent by weight of a monosaccharide and between about 60 to about 90 percent by weight on a dry basis of a salt. This composition may also be such that the dissolved sugar solid comprises between about 12 to about 18 percent by weight of said monosaccharide. The composition may further comprise a salt, and preferably the salt is a hygroscopic salt, including for example but not limited to, magnesium chloride, sodium chloride, calcium chloride, and potassium chloride.

The invention also includes a composition for treating a particulate including a sugar-water solution having between about 15 to about 80 percent by weight of a dissolved sugar solid, in which the dissolved sugar solid comprises between about 2 to about 60 percent by weight of a monosaccharide; and the composition also includes a salt. This composition may include between about 12 to about 18 percent by weight of a monosaccharide in the dissolved sugar solid. The salt of this invention may be a hygroscopic salt, including but not limited to magnesium chloride, sodium chloride, calcium chloride, and potassium chloride. The salt may be from about 1 percent to about 99 percent of the composition by weight.

The invention also includes methods of treating or suppressing a particulate or of treating a surface using any of the compositions of the invention. The compositions may also be used to stabilize a surface and suppress dust and erosion in a surface.

The particulate and/or surface may be a friable solid, including but not limited to a gravel, a soil, a cinder, a sand, a mineral, coal, sawdust, woodchips, bark mulch, an aggregate, a dirt, coal dust, rock dust, and clay.

The composition may be applied to a particulate using an apparatus such as for example but not limited to, a water truck, a sprayer truck, a tractor-trailer tanker, a computerized spray bar, a mining tanker, a towable tank, an all-wheel drive tanker, a water pull, a mix paver, a tailing pond machine, a military tanker vehicle, a hydroseeder, a crane and pump, a crop duster airplane, a crop duster helicopter, a hand sprayer, a helicopter drop container, a rotary cross-shaft mixer, and a spraying roto-tiller.

A further embodiment of the invention includes a surface treated by any composition of the invention. Such a surface may be, but is not limited to, a road, a walkway, a parking lot, a floor, a coal pile, a runway, a helicopter landing pad, a driveway, a bicycle path, a jogging path, a forest trail, a garden path, a construction site, a mine tailing pond, a tailings pile, a slope or berm, a sand dune, a hillside, a mineral storage pile, a railway transit car, and a storage container.

A further embodiment of the invention includes a composition for treating a particulate including an aqueous particulate material treating agent including a dissolved sugar solid. The dissolved sugar solid may be between about 2 percent to about 60 percent by weight of a monosaccharide.

A further embodiment of the invention includes a dust control and soil stabilizing composition including an aqueous dust control and soil stabilizing composition that includes a dissolved sugar solid. In this composition the dissolved sugar solid may include between about 2 percent to about 60 percent by weight of a monosaccharide.

A further embodiment of the invention is a composition for treating a particulate including between about 5 to about 50 percent by weight on a dry basis of a sugar solid. The sugar solid may include between about 2 to about 60 percent by weight of a monosaccharide. The composition may also include between about 60 to about 90 percent by weight on a dry basis of a salt.

Any of the compositions of the invention may include lignin, sometimes in an amount between about 1 percent and 99 percent by weight of the composition. The compositions may further include a tracer, which may be a fluorescent tracer.

The sugar solid used in the compositions of the invention may include, but is not limited to, corn sugar, cane sugar, beet sugar, sorghum sugar, maple sugar, wheat sugar, tapioca sugar, potato sugar, cassava sugar, and manioca sugar. The sugar solid may be between about 6 percent to about 39 percent by weight of a monosaccharide, or it may be about 14 percent by weight of a monosaccharide.

The dissolved sugar solid may also include between about 1 percent to about 99 percent by weight of a polysaccharide. The dissolved sugar solid may also include dextrose, and it may have a sugar profile of said between about 2 to about 60 percent dextrose, between about 2 to about 60 percent maltose, between about 2 to about 60 percent maltotriose, and between about 15 to about 80 percent polymers of dextrose.

The non-limiting Examples herein below are illustrative of compositions of the invention, and also of methods of using the compositions of the invention.

EXAMPLES

Example 1

An experimental test to determine the effectiveness of a Caliber® blend as a dust suppressing, soil stabilization, and erosion controlling agent was performed by the Federal Highway Administration beginning on Jul. 27, 2002 in Tucson, Ariz. The description of the Caliberg® corn product is set forth in U.S. Pat. No. 6,468,442 and is incorporated by reference herein. Five other compositions were tested in addition to the Caliber® blend. The six compositions tested were as follows:

Caliber®/magnesium chloride blend (20%/80% respectively)

Soil Sement™

Permazyme™ lignin concentrate magnesium chloride lignin/magnesium chloride blend (20%/80% respectively)

A dirt road was bladed to form windrows on each side. Each composition was then sprayed on a different section of the dirt road, followed by a lift of base being bladed across and repeated until all base was distributed.

Two lighter applications of each composition were then applied on top of this layer, and the applications were allowed to penetrate fully before compacting the surface with a rubber tire roller.

After a four and a half month duration of being exposed to the elements and traffic, the only two compositions that had not failed in performance were the Caliber®/magnesium chloride blend and the lignin/magnesium chloride blend. Of these two remaining compositions, the Caliber®/magnesium chloride blend had notably better stabilization qualities and a tighter surface than the lignin/magnesium chloride blend. The included pictures illustrate the road surface, the spraying procedure, a close-up of the road surface at the time of application, and a close-up of the road surface after four and a half months. The close-up picture of the road surface after four and a half months displays a skid mark left by a truck on the surface, indicating the surface tightness and hardness resulting from the treatment with the Caliber®/magnesium chloride blend.

Example 2

DC-1000 and DC-2000 are a blend of the Caliber® corn product (U.S. Pat. No. 6,468,442 B2) and 30% $MgCl_2$. The DC products adhesive properties, combined with the hygroscopic nature of $MgCl_2$, enhances the road base by increasing the stability and retaining the fine soil particles. The application rates are varied depending on the road base to which the composition is being applied.

DC-1000 Typical Properties:
Dissolved Solids: 30%–33%
$MgCl_2$: 27%±1.0%
Carbohydrates: 5.2%–5.8%
Specific Gravity: 1.30±0.02
pH: 6.0–8.0
Solubility: >98%
Appearance: translucent tan
Odor: none
DC-2000 Typical Properties:
Dissolved Solids: 35%–37%
$MgCl_2$: 24%±1.0%
Carbohydrates: 11%–13%
Specific Gravity: 1.31±0.02
pH: 6.0–8.0
Solubility: >98%
Appearance: translucent tan
Odor: none The following is a recommended application procedure for applying DC-1000 or DC-2000 to a dirt or gravel road surface:

1) Pre-wet the road surface if necessary prior to blading;
2) Blade/windrow 1–3 inches of road base to one side;
3) Wet road surface with water (recommended application is 0.3 to 0.5 gallons per square yard, as necessary to dampen the surface, but not to the point of becoming muddy or runny);
4) Apply approximately 0.35 gallons/square yd. of DC-1000 or DC-2000 to road and windrow;
5) Blade mix the road base and windrow several times to ensure dust suppressant is mixed thoroughly and windrow is smoothed out;
6) Wet road surface with water if necessary;
7) Blade road to a modified A-crown (drop at least one-half inch/foot from center to side or at least a 4% crown);
8) Apply 0.15 gallons/square yd. of DC-1000 or DC-2000 to road surface; and
9) Compact road surface with rubber tire roller and steel wheel if available.

Results similar to the above application may also be attained by injecting the material directly into a milling machine and then blading and compacting the road surface. This process eliminates the need for pre-wetting the road and multiple passes and provides an extremely homogeneously mixed and consistent material.

The quantity of the material to be used depends largely on the type of area, as well as the composition of the base material. Further, it also depends on the expected types and volume of traffic, as well as the exposure to the elements (sun, wind, and precipitation).

An aggregate where all the particles have approximately the same size is very hard to bind. The life-span of a treatment will be considerably shorter. If on the other hand, the aggregate contains a substantial concentration of coarse or fine material, it will require more material to attain the same strength as an aggregate that has the optimal amount of binding soil.

It is important that the aggregates are of good quality and have a graded particle size distribution. For example the No. 200 sieve should range between 12–15% and this should be a sufficient quantity of fine particles to give the right ratio for a tight and smooth surface. No particles should have a size larger than half the thickness of the layer to be treated.

Aggregate Base Course Specification

| Sieve Size | Percentage by Weight Passing Square inch Mesh Sieve |
|---|---|
| 1½ Inch | 100 |
| 1 Inch | 95–100 |
| ¾ Inch | |
| No. 4 | 30–50 |
| No. 8 | |
| No. 200 | 12–15 |

Aggregates for gravel roads shall be crushed stone, crushed gravel, natural gravel material that conforms to the quality requirements of AASHO M 47 except that the requirements for the ratio of the minus No. 40 sieve fraction, stated in 2.2.2 of AASHO 147, shall not apply. The requirements for the Los Angles wear test (AASHO T 96) shall apply.

It is not only the particle size distribution that is of importance, the aggregates also have to be of good quality. Particularly the coarse aggregates should be hard, so they will not be crushed or milled down.

The quantity used should be adapted to the influence from the weather conditions. Open and dry sections, which are exposed to the sunshine and wind, require a larger quantity than those areas that are in shady, damp sections. The surface is also more exposed to wear on curves, hills, and high traffic loads. These areas require a higher application amount.

Reapplication should be made prior to significant deterioration of the road surface. This will prevent loss of the fine grained soil particles and protect the investment in the road surfacing gravels. The amount of residual material remaining in the surface will often allow for a lower reapplication rate.

Traffic should not be allowed until the material has penetrated.

Example 3

In military desert bases, it is desired to provide roadways, helicopter landing pads, and other useful surfaces on the fine, dry, sandy soil that are compacted and have greatly reduced dust generating capacities. A composition comprising 50% by weight on a dry basis of a sugar solid is applied to a sandy soil surface in an area that is plowed flat for use as a helicopter landing pad. 1 gallon per square yard is applied to the surface and allowed to penetrate fully. A second application of 1 gallon per square yard is applied to the surface and allowed to penetrate fully. If desired, more applications may be applied until the desired amount of surface compactness and dust suppression is achieved.

Example 4

In the open transport and storage of coal, such as in rail cars, often large piles of coal are exposed to the elements, generating coal dust. This coal dust, in addition to being an environmental nuisance, also poses a substantial health hazard. To prevent the dust from becoming airborne, a technique known as "stockpile capping" is often used. The compositions of the present invention can be used in this capacity. For example, a composition comprising 60 percent by weight on a dry basis of magnesium chloride, and 30 percent by weight on a dry basis of a sugar solid is applied to the surface of a coal pile in an open rail car. 0.7 gallons per square yard are applied to the surface and allowed to penetrate fully. If desired, more applications may be applied until the desired amount of surface compactness and dust suppression is achieved.

Example 5

Caliber® is applied to a road surface material using a rotary cross shaft mixer equipped with the necessary controls to meter the product and provide a homogeneous mixture. No water is added during the process. The result is a more uniform road surface that is better blended and provides an increase in the duration of the dust suppression and soil stabilization capabilities of the product.

Example 6

A composition comprising 50 percent Caliber® and 20 percent on a dry weight basis of lignin is applied to a road surface as described in example 1. The use of lignin instead of a salt is beneficial, as it provides a more flexible end composition and it reduces the addition of salts to the environment.

Example 7

Often during the application of seeds to a soil surface, to prevent the elements from washing or blowing away the seeds, a composition is applied after the seeds have been distributed. The compositions of the present invention can be used in this capacity. For example, grass seed is distributed to a soil surface at a rate of 1.0 pounds of seed per 100 square yards. Following the seed application, 1.0 gallon per square yard of a composition comprising 50 percent by weight of a sugar solid is sprayed on top of the seed.

All publications mentioned hereinabove are hereby incorporated in their entirety by reference.

While the foregoing invention has been described in some detail for purposes of clarity and understanding, it will be appreciated by one skilled in the art from a reading of this disclosure that various changes in form and detail can be made without departing from the true scope of the invention and appended claims.

What is claimed is:

1. A method for treating an area having a need for dust control and soil stabilization, comprising:
   applying to an area in need of dust control and soil stabilization an effective amount of an aqueous dust control and soil stabilizing composition comprising a dissolved sugar solid, wherein said dissolved sugar solid comprises at least one monosaccharide.

2. The method of claim 1, including wherein said dissolved sugar solid comprises between about 2 percent to about 60 percent by weight of a monosaccharide.

3. The method of claim 2, including wherein said monosaccharide comprises dextrose.

4. The method of claim 1, including wherein said dissolved sugar solid comprises between about 12 percent to about 18 percent by weight of a monosaccharide.

5. The method of claim 1, including wherein said composition further comprises a hygroscopic salt.

6. The method of claim 5, including wherein said hygroscopic salt is selected from the group consisting of magnesium chloride and calcium chloride.

7. The method of claim 1, including wherein the sugar profile of said dissolved sugar solid comprises between about 2 to about 60 percent dextrose, between about 2 to about 60 percent maltose, between about 2 to about 60 percent maltotriose, and between about 15 to about 80 percent polymers of dextrose.

8. A method for treating an area having a need for dust control and soil stabilization comprising:
   applying to the area having a need for at least one of dust control and soil stabilization a sugar-water solution having between about 15 to about 80 percent by weight of a dissolved sugar solid, wherein said dissolved sugar solid comprises between about 2 to about 60 percent by weight of a monosaccharide; and a salt.

9. The method of claim 8, including wherein said dissolved sugar solid comprises between about 12 to about 18 percent of said monosaccharide.

10. The method of claim 9, including wherein said salt is a hygroscopic salt.

11. The method of claim 10, including wherein said hygroscopic salt is selected from the group consisting of magnesium chloride and calcium chloride.

12. A method for treating an area having a need for dust control and soil stabilization comprising:
   applying to the area having a need for dust control and soil stabilization a composition comprising between about 5 percent to about 50 percent by weight on a dry basis of a sugar solid, wherein said sugar solid comprises at least one monosaccharide.

13. The method of claim 12, including wherein said sugar solid comprises between about 2 percent to about 60 percent by weight of a monosaccharide.

14. The method of claim 12, including wherein said composition further comprises between about 60 percent to about 90 percent by weight on a dry basis of salt.

15. The method of claim 1, 5, 6, 8 or 12, including wherein said composition further comprises lignin.

16. The method of claim 1, 5, 6, 8 or 12, including wherein said composition further comprises a tracer.

17. The method of claim 16, including wherein said tracer is a fluorescent dye.

18. A method for treating an area having a need for dust control or soil stabilization, comprising:
applying to an area in need of at least one of dust control and soil stabilization an effective amount of an aqueous dust control and soil stabilizing composition comprising a dissolved sugar solid, wherein the sugar profile of said dissolved sugar solid comprises between about 2 to about 60 percent dextrose, between about 2 to about 60 percent maltose, between about 2 to about 60 percent maltotriose, and between about 15 to about 80 percent polymers of dextrose.

19. The method of claim 18, wherein said dissolved sugar solid is selected from the group consisting of 25 Dextrose Equivalent (D.E.) corn syrup (CSU), 36 D.E. CSU, 43 D.E. CSU, and 63 D.E. CSU.

20. The method of claim 19, wherein said aqueous dust control and soil stabilizing composition further comprises lignin.

21. The method of claim 18, wherein said dust control and soil stabilizing composition further comprises a hygroscopic salt.

22. The method of claim 21, wherein said hygroscopic salt is selected from the group consisting of magnesium chloride, calcium chloride, sodium chloride, and potassium chloride.

23. The method of claim 18, wherein said dust control and soil stabilizing composition further comprises a tracer.

24. The method of claim 23, wherein said tracer is a fluorescent dye.

25. A method for treating an area having a need for dust control or soil stabilization comprising:
applying to the area having a need for at least one of dust control or soil stabilization a composition comprising between about 5 percent to about 50 percent by weight on a dry basis of a sugar solid and between about 60 percent to about 90 percent on a dry basis of salt, wherein said sugar solid comprises at least one monosaccharide.

26. The method of claim 25, wherein said aqueous dust control and soil stabilizing composition further comprises lignin.

27. A method for treating an area having a need for dust control or soil stabilization, comprising:
applying to an area in need of at least one of dust control and soil stabilization an effective amount of an aqueous dust control and soil stabilizing composition comprising a dissolved sugar solid and lignin, wherein said dissolved sugar solid comprises at least one monosaccharide.

* * * * *